United States Patent
Evans

(10) Patent No.: US 7,626,778 B2
(45) Date of Patent: Dec. 1, 2009

(54) TAPE DRIVE APPARATUS

(75) Inventor: Nigel Ronald Evans, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 611 days.

(21) Appl. No.: 11/245,331

(22) Filed: Oct. 6, 2005

(65) Prior Publication Data

US 2006/0087759 A1    Apr. 27, 2006

(30) Foreign Application Priority Data

Oct. 8, 2004    (GB) ................. 0422339.2

(51) Int. Cl.
*G11B 19/02* (2006.01)

(52) U.S. Cl. .............. 360/72.2; 360/48; 360/69; 360/77.12; 360/78.03; 360/78.08

(58) Field of Classification Search ............. None
See application file for complete search history.

(56) References Cited

U.S. PATENT DOCUMENTS

| | | | |
|---|---|---|---|
| 5,130,813 A | | 7/1992 | Oie et al. |
| 5,335,328 A * | | 8/1994 | Dunn et al. ............. 710/33 |
| 5,406,425 A * | | 4/1995 | Johnston et al. ........ 360/48 |
| 5,432,646 A * | | 7/1995 | Nakamura et al. ...... 360/18 |
| 5,438,674 A * | | 8/1995 | Keele et al. ............ 711/4 |
| 5,576,903 A * | | 11/1996 | Brown et al. ........... 360/48 |
| 5,598,388 A * | | 1/1997 | Van Maren et al. ..... 369/59.25 |
| 5,734,819 A * | | 3/1998 | Lewis .................... 726/29 |
| 5,911,150 A * | | 6/1999 | Peterson et al. ......... 711/162 |
| 6,008,961 A * | | 12/1999 | Ozue ..................... 360/72.2 |
| 6,058,494 A * | | 5/2000 | Gold et al. ............. 714/42 |
| 6,219,486 B1 * | | 4/2001 | Hoshi .................... 386/46 |
| 6,229,659 B1 * | | 5/2001 | Watkins et al. ......... 360/48 |
| 6,260,006 B1 * | | 7/2001 | Wong et al. ............ 703/27 |
| 6,286,061 B1 * | | 9/2001 | Ross ..................... 710/33 |
| 6,301,067 B1 * | | 10/2001 | Takayama .............. 360/48 |
| 6,307,700 B1 * | | 10/2001 | Takayama .............. 360/72.2 |
| 6,611,394 B1 * | | 8/2003 | Kato et al. ............. 360/69 |
| 6,643,086 B1 * | | 11/2003 | Hiramoto et al. ....... 360/69 |
| 6,718,427 B1 * | | 4/2004 | Carlson et al. ......... 711/5 |
| 6,842,841 B1 * | | 1/2005 | Kuik et al. ............. 711/203 |
| 6,940,666 B2 * | | 9/2005 | Hanagata et al. ....... 360/15 |
| 7,046,464 B2 * | | 5/2006 | Hirose ................... 360/48 |
| 7,206,156 B2 * | | 4/2007 | Ballard .................. 360/69 |
| 7,209,306 B2 * | | 4/2007 | Nakamura .............. 360/48 |
| 7,209,308 B2 * | | 4/2007 | Takayama .............. 360/69 |
| 7,274,526 B2 * | | 9/2007 | Morling et al. ......... 360/72.2 |
| 7,480,113 B2 * | | 1/2009 | Evans .................... 360/69 |
| 2003/0126460 A1 * | | 7/2003 | Camble et al. .......... 713/200 |
| 2008/0133827 A1 * | | 6/2008 | Topham et al. ......... 711/111 |

FOREIGN PATENT DOCUMENTS

| | | |
|---|---|---|
| EP | 0 173 538 | 3/1986 |
| EP | 1 102 277 | 5/2001 |
| GB | 2 258 080 | 1/1993 |
| GB | 2 331 395 | 5/1999 |
| WO | WO 93/105532 | 5/1993 |

* cited by examiner

*Primary Examiner*—Dismery E Mercedes

(57) ABSTRACT

One embodiment of a tape drive apparatus has a non-volatile memory for storing an identifier. Data that is written by the tape drive apparatus to a loaded tape media is tagged using the identifier. This facilitates to identify the tape drive apparatus that has written the data onto the tape media such as for the purpose of failure analysis. Other devices and methods are included.

17 Claims, 4 Drawing Sheets

TAPE DRIVE APPARATUS

CLAIM TO PRIORITY

This application claims priority to copending United Kingdom utility application entitled, "Tape Drive Apparatus," having serial number GB 0422339.2, filed Oct. 8, 2004, which is entirely incorporated herein by reference.

TECHNICAL FIELD

The present disclosure generally relates to the field of tape drives and the storage of data on tape media.

BACKGROUND

For decades information has been stored on magnetic tape media using tape drives. Initially the magnetic tapes were wound about large reels in similar manner as film for early film projectors. In more recent years, the magnetic tape has typically been housed in a cartridge or cassette, extending internally in the cartridge from a supply reel to a take-up reel.

In some systems, the magnetic tape has longitudinal tracks recorded thereon (e.g. tracks that extend along the major length dimension of the tape). In other systems, the path of the magnetic tape is such that the tape is at least partially wrapped around a drum in a manner to transduce helical stripes or tracks on the magnetic tape.

When data is read from a magnetic tape, errors can occur. This can be due to defective operation of the tape drive that has written the data onto the magnetic tape, such as clogging of the tape drive's heads.

SUMMARY

In accordance with one embodiment of the present disclosure, there is provided a tape drive apparatus that has a non-volatile memory for storing an identifier. The tape drive apparatus has an interface for receiving data and a data processing apparatus for tagging the data using the identifier. The tagged data is written to a loaded tape media by a data transfer apparatus. The tape media has groups of tracks, each group of tracks having a predefined number of tracks. The data transfer apparatus is adapted to write the tagged data to tracks of the same group of tracks, such that the identifier is stored multiple times in the same group of tracks.

In one embodiment, the identifier that is stored in the non-volatile memory of the tape drive apparatus unequivocally identifies the tape drive apparatus within a set of tape drive apparatuses that are used by a customer or for global identification of the tape drive apparatus. When an attempt to read data from the tape media fails, there is a chance that at least the identifier that has been used to tag the data can be recovered from the tape media.

This facilitates identification of the tape drive apparatus that has previously written the tagged data onto the tape media. The identified tape drive apparatus can be inspected and tested for identification of the root cause of the failed read attempt. For example, a special tape is loaded into the identified tape drive apparatus for cleaning the tape drive apparatus heads and/or to perform other diagnostic or maintenance operations.

In accordance with an embodiment of the present disclosure, the data processing apparatus of the tape drive is operable to transform the data into a sequence of data fragments. At least a sub-set of the data fragments is tagged using the identifier. In one embodiment, a plurality of the data fragments is tagged using the identifier. This has the advantage that even if the write operation was erroneous, e.g. due to clogged heads, there is a good chance that the identifier can still be read from the tape media as it is stored on the tape media multiple times.

In accordance with an embodiment of the present disclosure, each data fragment has a data portion for carrying a portion of the data that is written onto the tape media. A sub-set of the data fragments has control portions, such as header or trailer portions, for carrying the identifier.

In accordance with a further embodiment, the data transfer apparatus is adapted to write the data as a track being oblique to a direction of travel of the tape media. For example, the tracks can be written onto the tape media in the form of helical stripes.

Each track has a plurality of data fragments and each data fragment within the track has an assigned fragment number. The data processing apparatus selects the sub-set of the data fragments for tagging with the identifier using the data fragment numbers. Depending on the selection scheme, this facilitates to spread the identifier over multiple data fragments of the track.

In accordance with an embodiment of the present disclosure, the data processing apparatus is operable to calculate a modulus of the fragment numbers for selection of the sub-set of the data fragments to be tagged with the unique identifier.

In accordance with an embodiment of the present disclosure, at least first and second identifiers are used for tagging the data. The combination of the at least first and second identifiers serves to unequivocally identify the tape drive apparatus within a set of tape drive apparatuses. For example, a first sub-set of the data fragments is tagged using the first identifier and a second sub-set of the data fragments is tagged using the second identifier. The fragments of the first sub-set have a first predefined modulus of their fragment numbers and the data fragments of the second sub-set have a second predefined modulus of their data fragment numbers.

In accordance with an embodiment, the identifier has at least a first and second predefined set of bits. A first sub-set of the data fragments is tagged using the first set of bits and a second sub-set of the data fragments is tagged using the second set of the bits.

In another aspect, one embodiment of the present disclosure relates to a tape drive apparatus for reading data from a loaded tape medium, wherein the data is tagged with an identifier. The tape media has groups of tracks, each group of tracks having a predefined number of tracks, the tagged data being written to tracks of the same group of tracks, such that the identifier is stored multiple times in the same group of tracks.

The tape drive apparatus has a data processing apparatus for detecting if the same group of tracks is corrupted by detecting tagged data stored on a track of that same group of tracks that has been tagged using another identifier and for writing an event to an event log, if an attempt to read the data from the loaded tape media has failed due to a detected corruption. Each event entry into the event log comprises the identifier that was used to tag the data. This facilitates the identification of a defective tape drive apparatus that has previously written the data onto the tape media.

In another aspect, one embodiment of the present disclosure relates to an analytical program tool for reading such an event log from a tape drive apparatus. For example, the analytical program tool can be used to perform a statistical evaluation of the event log for identification of a tape drive that requires maintenance.

BRIEF DESCRIPTION OF THE DRAWINGS

In the following, various embodiments of the present disclosure will be described, by way of example only, and with reference to the drawings in which.

DETAILED DESCRIPTION

Figure 1:
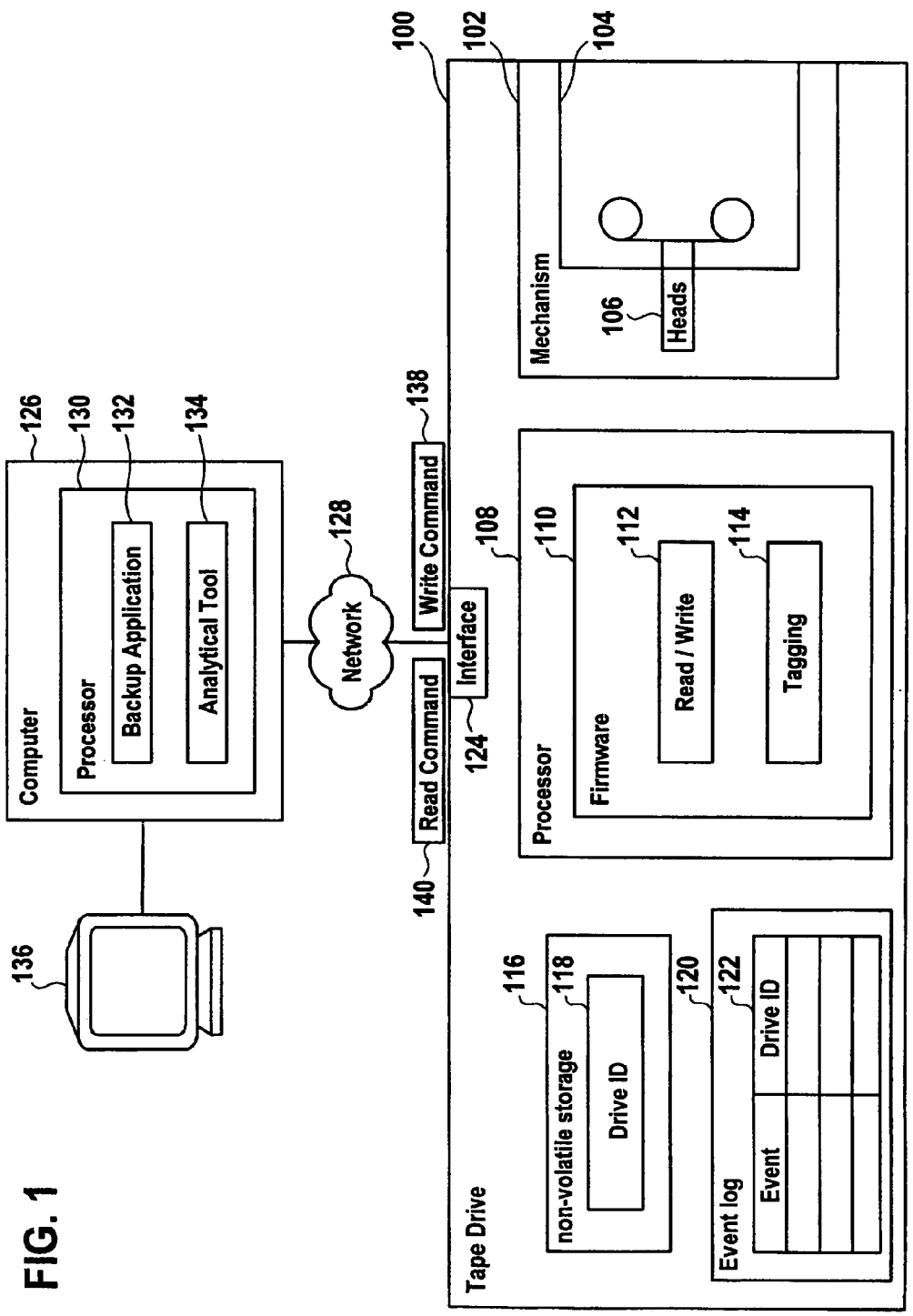
FIG. 1 is a block diagram of a first embodiment of a tape drive apparatus.

FIG. 1 shows a tape drive 100 having tape drive mechanism 102, which loads and ejects tape media 104 and winds the tape media 104 forwards or backwards as required for reading and writing data. In a DDS (Digital Data Storage) tape drive, the read/write heads 106 are mounted on a helical scanning drum, which rotates to sweep the heads past the tape in a motion oblique to the direction of travel of the tape. The tape drive apparatus 100 has a processor 108 that serves to execute firmware 110. Firmware 110 comprises instructions 112 for reading/writing data. Further, the firmware 110 comprises instructions 114 for tagging the data before it is written to the tape media 104.

The tape drive 100 has a non-volatile storage 116 for storing a tape drive identifier (ID) 118 that unequivocally identifies the tape drive 100 within a set of tape drives that is used by a customer.

Further, the tape drive 100 has a storage 120 for storing an event log. The event log is stored as a table 122. Each entry into the table 122 comprises a description code of the event, such as a failed attempt to read data from the tape media 104, and the tape drive ID that is recovered from the tape media 104. The tape drive ID serves to identify the tape drive that has previously written the tagged data onto the tape media 104.

The tape drive 100 has an interface 124 for coupling the tape drive 100 to a computer 126 via a network 128. The computer 126 has a processor 130 for running a backup application program 132 and an analytical tool 134. The computer 126 is coupled to a monitor 136.

In operation the tape drive 100 receives a write command 138 to write data onto the loaded tape media 104 from the backup application 132. This invokes the instructions 114. The instructions 114 read the tape drive ID 118 from the non-volatile storage 116 and tag the data using the tape drive ID 118. The tagged data is written to the tape media 104 by the instruction 112. The tagged data is written to a group of tracks of the tape media.

When the tape drive apparatus receives a read command 140 from the backup application 132, this invokes the instructions 112 in order to read the requested data from the tape media 104. If an attempt to read data from the tape media 104 fails, the instructions 112 generate an entry for the table 122 that indicates the failed read attempt and the tape drive ID that tags the data that is stored on the tape media 104.

The instructions 112 check the data that is read from the tape media 104 for being tagged by means of the same identifier, i.e. the tape drive ID. If data has been stored in the group of tracks from which the requested data is read that has been tagged using another tape drive ID, this indicates that the data stored in this group of tracks is corrupted such that the read attempt fails. Data that has been tagged using another tape drive ID can be present in the group of tracks due to a "drop-in" from a previous incomplete write pass by another tape drive.

For example, if the DDS standard is used, a group of tracks is constituted by a DDS group. A DDS group consists of 22 or 23 different frames (the 23rd frame is optional and consists of error-correcting information).

Each frame comprises 2 tracks: The tracks differ in that they are recorded with different magnetic azimuths. They are generally referred to as POS (positive azimuth) and NEG (negative azimuth) tracks.

The number of data fragments in every track is given in the following for same DDS formats:
DDS-3: 96 fragments
DDS-4: 96 fragments
DAT72: 128 fragments
DAT160: 384 fragments In one embodiment, the instructions 114 fragment the data into data fragments before the data is tagged and written onto the tape media 104.

Figure 2:
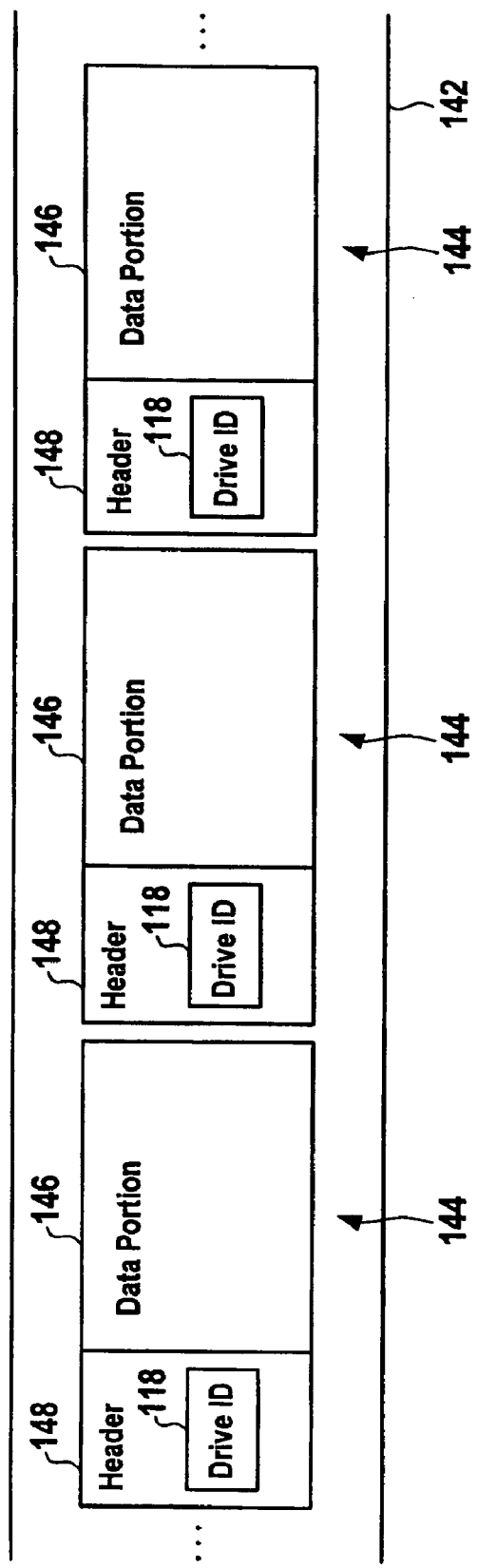
FIG. 2 illustrates a portion of a track on which the data is written.

FIG. 2 shows a schematic view of a track that is written by the head 106 onto the tape media 104 that has multiple data fragments.

Depending on the tape drive standard that is utilized, the track 142 runs in a longitudinal direction along the major length dimension of the tape media 104.

Alternatively, the track 142 has the form of a helical stripe that is oblique to the major length dimension of the tape media 104 and hence, oblique to the direction of travel of the tape media 104 when the tape media 104 is wound backwards or forward by the tape mechanism 102. The tracks are grouped into groups of tracks where each group of tracks is supposed to be used for write operations by a single tape drive apparatus. In other words, data that is stored on tracks of the same group of tracks needs to originate from the identical tape drive; otherwise all data stored on that group of tracks is considered to be corrupted.

In the example considered here, each of the data fragments 144 has a data portion 146 for carrying a portion of the data and a header 148 for carrying the tape drive ID 118 of the tape drive 100 that has written the data onto the tape media 104. Alternatively, the tape drive ID 118 is stored in a trailer of the fragments 144 or on another defined location.

Figure 3:
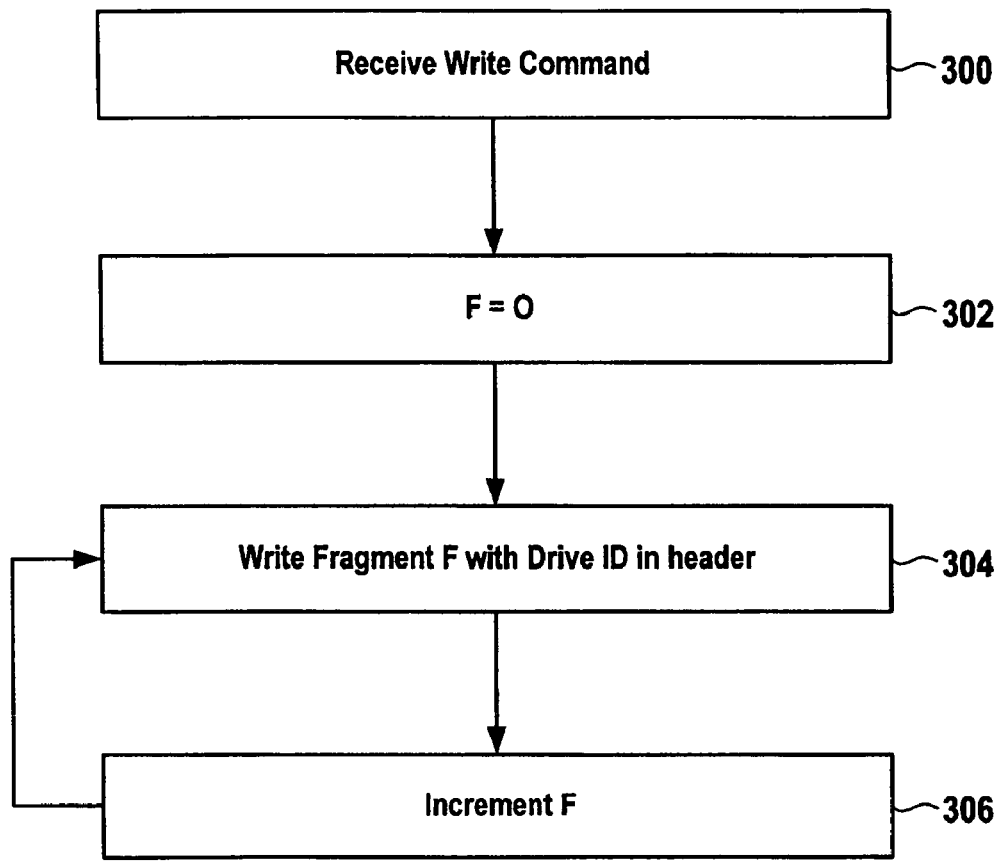
FIG. 3 is a flow diagram illustrating a method for writing the data onto the tape media.

FIG. 3 shows a corresponding flow chart. In step 300, the tape drive receives a write command at its network interface. In step 302, the fragment index F is initialized to be equal to zero. In step 304, the first fragment F=0 is tagged with the tape drive ID of the tape drive and is written onto the tape media (step 304). The fragment index F is incremented in step 306, and the control goes back to step 304 in order to tag and write the next fragment. Steps 304 and 306 are carried out repetitively until the data has been completely written onto the tape media.

It is to be noted that tagging of each one of the fragments with the tape drive identifier is not essential but that tagging a sub-set of the data fragments with the tape drive identifier can be sufficient in order to recover the tape drive identifier from a track of data fragments when a read operation fails.

Figure 4:
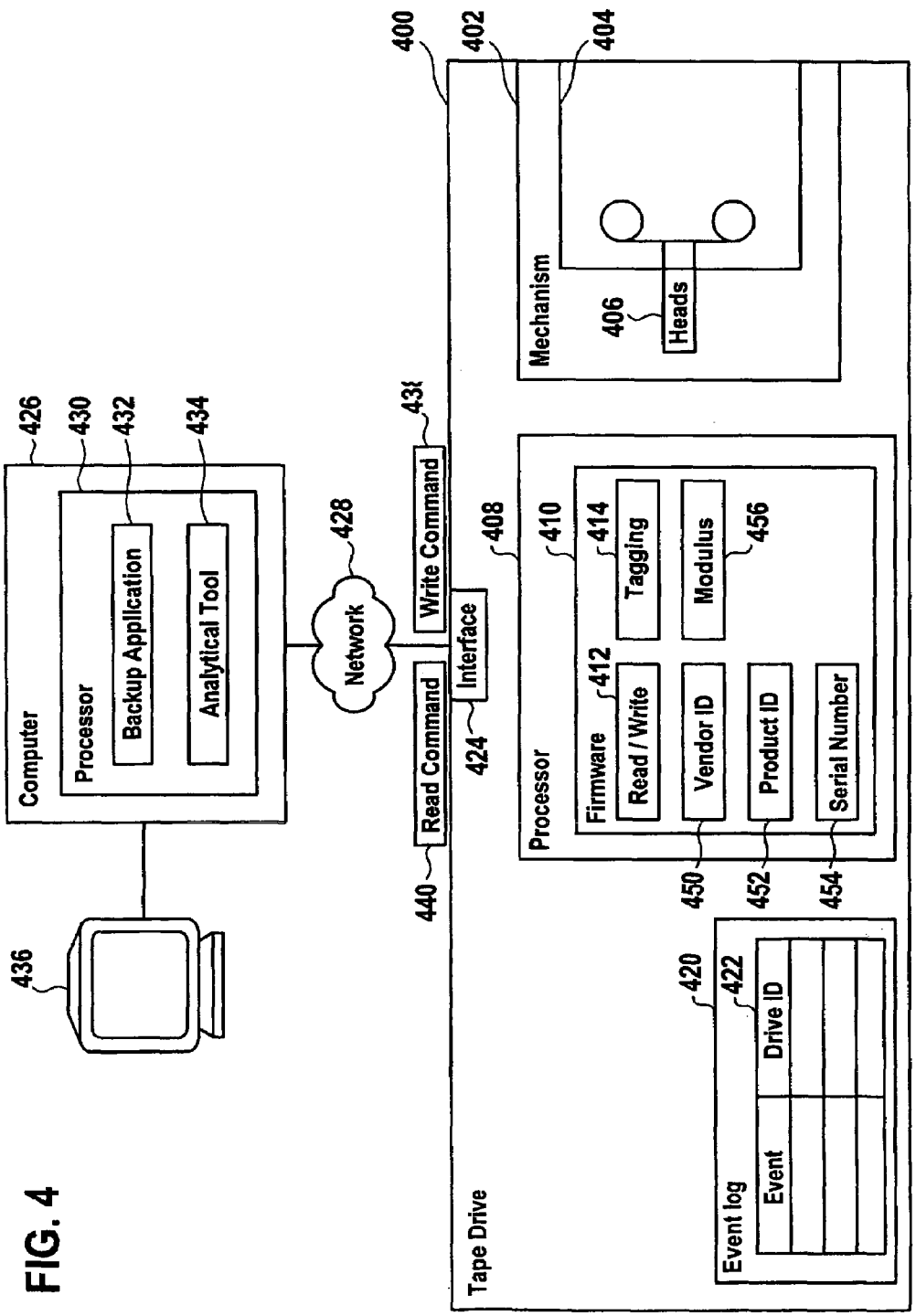
FIG. 4 is a block diagram of an alternative embodiment of a tape drive apparatus.

FIG. 4 shows an alternative embodiment of the tape drive of FIG. 1. Elements of the embodiment of FIG. 4 that correspond to elements in the embodiment of FIG. 1 are designated by like reference numerals, where like references numbers are in the form of 4XX in FIG. 4 and 1XX in FIG. 1.

The firmware 410 of the tape drive 400 contains a vendor ID 450, a product ID 452 and a serial number 454 of the tape drive 400. For example, the vendor ID 450 is a 2 Bit data word, the product ID 452 is a 14 Bit data word and the serial number 454 is an alphanumeric string having ten ASCII Bytes.

Further, the firmware 410 has instructions 456 that serve for identification of three different sub-sets of data fragments that are written onto a track. The determination whether a given data fragment belongs to one of the sub-sets is performed by calculating the modulus of the fragment index F of that data fragment. The modulus of the fragment index F is tested against a number of conditions for identification of one of the sub-sets of data fragments to which the given data fragment belongs. For example, the following conditions can be utilized:

$$\mod 16\{F\} = \begin{cases} 13 \Rightarrow VendorID, ProductID, Characters\_9\_and\_10\_of\_Serial\_Number \\ 14 \Rightarrow Characters\_5\_to\_8\_of\_Serial\_Number \\ 15 \Rightarrow Characters\_1\_to\_4\_of\_Serial\_Number \end{cases}$$

where mod16 (F) is the modulus 16 of the fragment index F. The modulus operation mod M (F) divides F by M and returns only the remainder as the result of the modulus operation. In one embodiment considered here M is 16. M=16 is a convenient choice as the number of fragments per track is 384 in the DDS format.

If the mod16 (F) of a given data fragment is 13, this means that the vendor ID 450, the product ID 452 and the characters 9 and 10 of the serial number 454 are written to the header of that data fragment. If the modulus 16 (F) is 14, the characters 5 to 8 of the serial number are written to the header of the data fragments and if mod16 (F) is 15, the characters 1 to 4 of the serial number 454 are written to the header of that data fragment. As a consequence, three different sub-sets of the data fragments are defined which carry different portions of the tape drive identification information that consists of the combined vendor ID 450, product ID 452, and serial number 454 in order to unequivocally identify the tape drive 400.

If the mod16 (F) is between 0 and 12, neither of the vendor ID 450, product ID 452, nor the serial number 454 is written to the header of that data fragment.

The tape drive ID that is written into the table 422 as an event entry consists of the vendor ID 450, the product ID 452, and the serial number 454 that has been recovered from the tape medium 404 by the instructions 412.

The analytical tool 434 enables a user of the computer 426 to load the event log 420 onto the computer 426 for statistical analysis and visualization on the monitor 436.

It should be emphasized that the above-described embodiments of the present disclosure are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of this disclosure.

Therefore, having thus described the invention, at least the following is claimed:

1. Tape drive apparatus comprising:
    a non-volatile memory for storing an identifier, the identifier unequivocally identifying the tape drive apparatus within a set of tape drive apparatuses,
    an interface for receiving data,
    a data processing apparatus for tagging the data using the identifier, and
    a data transfer apparatus for writing the tagged data to a loaded tape media, the tape media having groups of tracks, each group of tracks having a predefined number of tracks, the data transfer apparatus being adapted to write the tagged data to tracks of the same group of tracks, such that the identifier is stored multiple times in the same group of tracks.

2. The tape drive apparatus of claim 1, the data processing apparatus being operable to transform the data into a sequence of data fragments and to tag a sub-set of the data fragments with the identifier.

3. The tape drive apparatus of claim 2, each data fragment of the sub- set having a data portion carrying a portion of the data and a control portion carrying the tag.

4. The tape drive apparatus of claim 1, the tracks being oblique to a direction of travel of the tape media, at least one of the tracks comprising a plurality of data fragments, each data fragment having an assigned fragment number, the data processing apparatus being adapted to select a sub-set of the data fragments using the fragment numbers.

5. The tape drive apparatus of claim 4, the data processing apparatus being operable to calculate a modulus of the fragment numbers for selection of the sub-set.

6. The tape drive apparatus of claim 5, at least first and second identifiers being stored in a non-volatile memory, the data processing apparatus operable to tag a first sub-set of the fragments using the first identifier and to tag a second sub-set of the fragments using the second identifier, wherein the data fragments of the first sub-set have a first predefined modulus of their fragment numbers and the data fragments of the second sub-set have a second predefined modulus of their fragment numbers.

7. The tape drive apparatus of claim 5, wherein the identifier has a number of bits, the data processing apparatus operable to use a first predetermined set of the bits for tagging data fragments having a first predefined modulus of their fragment numbers and for using a second predefined set of the bits for tagging data fragments having a second predefined modulus of their fragment numbers.

8. A method of storing data on a tape media, comprising:
    reading an identifier from a non-volatile memory, the identifier being unique to a tape drive apparatus that is used for storing the data on the tape media, tagging the data using the identifier, and
    writing the tagged data to the tape media, the tape media having groups of tracks, each group of tracks having a predefined number of tracks, the tape drive apparatus being adapted to write the tagged data to tracks of the same group of tracks, such that the identifier is stored multiple times in the same group of tracks.

9. The method of claim 8, further comprising transforming the data into a sequence of data fragments, wherein at least a sub-set of the data fragments is tagged using the identifier.

10. The method of claim 9, each data fragment of the sub-set having a data portion carrying a portion of the data and a control portion carrying the tag.

11. The method of claim 8, wherein the tracks are oblique to a direction of travel of the tape media, at least one of the tracks comprising a plurality of data fragments, each data fragment having an assigned fragment number, and wherein the sub-set of the data fragments is selected using the fragment numbers.

12. The method of claim 8, further comprising calculating a modulus of the fragment numbers for selection of the sub-set.

13. The method of claim 8, wherein a first sub-set of the data fragments is tagged using a first identifier and a second sub-set of the data fragments is tagged using a second identifier, wherein the fragments of the first sub-set have a first predefined modulus of their fragment numbers and the data fragments of the second sub-set have a second predefined modulus of their fragment numbers.

14. The method of claim 8, identifier having a number of bits, wherein a first predefined set of the bits is used for tagging a first sub-set of the data fragments having a first predefined modulus of their fragment numbers and a second predefined set of the bits is used for tagging a second sub-set of the data fragments having a second predefined modulus of their fragment numbers.

15. The method of claim 8, wherein a set of first, second and third identifiers is used for identification of the tape drive apparatus, and wherein a first sub-set of the data fragments is tagged using the first and second identifiers, a second sub-set of the data fragments is tagged using a first sub-set of the bits of the third identifier and a third sub-set of the data fragments is tagged using a second set of the bits of the third identifier.

16. Apparatus for writing data to a storage medium, the apparatus comprising:
   means for storing at least one unique identifier for identification of the apparatus,
   means for labeling the data using the unique identifier, and
   means for writing the labeled data to the storage medium, the storage medium having groups of tracks, each group of tracks having a predefined number of tracks, the means for writing being adapted to write the labeled data to tracks of the same group of tracks, such that the unique identifier is stored multiple times in the same group of tracks.

17. The apparatus of claim 16, the means for labeling being operable to label a first sub-set of the data using a first unique identifier and labeling a second sub-set of the data using a second unique identifier.

* * * * *